United States Patent
Miller et al.

[15] 3,707,178
[45] Dec. 26, 1972

[54] ADHESION OF RAYON TEXTILE TO RUBBER WITH AQUEOUS DISPERSION OF BLOCKED ISOCYANATE OR ISOCYANATE DIMER, RUBBER LATEX AND RESORCINOL-FORMALDEHYDE RESIN

[72] Inventors: Robert Miller, Wayne, N.J.; Jerry L. Witt; Mabry L. Tidmore, both of Winnsboro, S.C.

[73] Assignee: Uniroyal, Inc., New York, N.Y.

[22] Filed: Oct. 14, 1970

[21] Appl. No.: 80,746

Related U.S. Application Data

[63] Continuation-in-part of Ser. No. 874,961, Nov. 7, 1969, abandoned.

[52] U.S. Cl. ................152/358, 152/355, 156/331, 156/110 A, 156/110 MD, 156/335, 161/190, 260/17 A, 260/29.2 TN
[51] Int. Cl. .........B32b 27/40, B60c 9/10, C09j 3/12
[58] Field of Search...156/331, 110 A, 110 MD, 335; 260/17, 17 A, 29.2 TN; 152/355, 358, 359

[56] References Cited

UNITED STATES PATENTS

| | | | |
|---|---|---|---|
| 3,325,333 | 6/1967 | Kigane | 156/331 |
| 3,268,467 | 8/1966 | Rye et al. | 260/29.3 |
| 3,278,333 | 10/1966 | Titzmann et al. | 156/110 MD |
| 2,990,313 | 6/1961 | Knowles et al. | 156/110 MD |
| 3,240,251 | 3/1966 | Atwell | 156/110 MD |

*Primary Examiner*—Robert F. Burnett
*Assistant Examiner*—C. B. Cosby
*Attorney*—James J. Long

[57] ABSTRACT

Rayon or nylon textile material (e.g., tire cord) which fails to develop adequate adhesion to rubber when pre-treated with the conventional aqueous RFL solutioning bath, is re-treated with an RFL solution to which an aqueous slurry of blocked isocyanate or isocyanate dimer has been added. The re-treated textile is dried and laminated to vulcanizable rubber stock. Upon vulcanization of the rubber, the re-treated textile develops satisfactory adhesion.

16 Claims, No Drawings

ADHESION OF RAYON TEXTILE TO RUBBER WITH AQUEOUS DISPERSION OF BLOCKED ISOCYANATE OR ISOCYANATE DIMER, RUBBER LATEX AND RESORCINOL-FORMALDEHYDE RESIN

CROSS-REFERENCE TO RELATED APPLICATION

This application is a continuation-in-part of our copending application Ser. No. 874,961, filed Nov. 7, 1969, now abandoned.

BACKGROUND OF THE INVENTION

1. Field of the Invention

This invention relates to a method of treating rayon or nylon textile material to improve its adhesion to rubber, textile material so treated, and a laminate of the treated textile material to rubber.

2. Description of the Prior Art

In certain rubber articles designed to withstand considerable stress in use the rubber is reinforced with plies of comparatively inextensible materials. Thus, rubber hose, belts and tires are commonly reinforced with filamentary textile such as rayon and nylon in the form of yarns, cords or fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent failure.

In order to improve the adhesion of the textile material to the rubber intermediate the textile plies, it is common practice to first apply a deposit of rubber on the textile material, such as a tire cord fabric, by passing the textile material through a bath of an aqueous dispersion of rubber, such as a rubber latex composition, as in a so-called "solutioning" treatment, and drying. The rubber latex solutioning composition, usually referred to as "RFL," contains a resin, i.e., a fusible, partially reacted resorcinol-formaldehyde resin, such as a condensate of resorcinol and formaldehyde in the ratio of one mole of resorcinol to about 0.5 to 0.8 mole of formaldehyde, and formaldehyde or a formaldehyde-yielding agent which on subsequent heating (as during vulcanization of the rubber intermediate the textile plies) cures the fusible resin to an infusible state.

The state of the art is further represented by the following:

U. S. Pat. No. 2,994,671, Thompson, Aug. 1, 1961, discloses an adhesive system based on (A) a water-soluble polymer selected from salts of alginic acid, polyacrylamide, sodium polyacrylate and methyl cellulose, (B) rubber latex and (C) blocked isocyanate which has been ball milled with a dispersing agent to form a slurry. The composition is disclosed as useful for adhering nylon to rubber.

Japanese Pat. No. 35-13226, Teijin, July 25, 1963, discloses an aqueous adhesive which is a dispersion of phenol-blocked isocyanate, latex, and resorcinol-formaldehyde resin.

U. S. Pat. No. 3,234,067, Krysiak, Feb. 8, 1966, discloses an aqueous adhesive for polyester, polyamide, cellulosic and natural fibers comprising an epoxide, blocked isocyanate, and RFL (resorcinol-formaldehyde-latex).

U. S. Pat. No. 3,307,966, Shoaf, Mar. 7, 1967, discloses adhering polyester, cotton, rayon or nylon by application of an epoxide and blocked isocyanate composition; optionally this may be followed by RFL treatment.

U. S. Pat. No. 3,325,333, Kigane et al., June 13, 1967, discloses an adhesive comprising a blocked isocyanate and RFL, in which the blocked isocyanate is methylolated.

Unfortunately, the conventional RFL (resorcinol-formaldehyde-latex) adhesive system is a highly sensitive system, in that poor adhesion will occur in many cases for no apparent reason. In effect, the system is too sensitive to processing variables. Thus, some rayon or nylon tire cord after being treated with the conventional RFL adhesive system is found to give unacceptable adhesion to the rubber stock. This may be due to any of a series of variables, such as temperature, concentration of components in the dip, finish on the fiber, etc. This failure of the textile to develop good adhesion with the conventional adhesive solution results in rejection of that batch of textile by the rubber fabricator, and the textile has to be sold off at a fraction of its true value for other uses where adhesion is not critical, at a great economic loss. The problem in this case is how to re-treat such substandard tire fabric in order to improve its adhesive characteristics sufficiently for it to become first quality. Unfortunately, retreatment with the conventional RFL system only improves the adhesion slightly or not at all. The invention is accordingly directed to an improved adhesion system which can give more dependable and consistent results, can produce good quality at a low cost, and can be used as a retreatment to "up-grade" conventionally treated fabric which has substandard adhesion.

SUMMARY OF THE INVENTION

The present invention is based on the surprising discovery that rayon or nylon textile material, which has previously been treated with the conventional RFL solution but has for some reason failed to develop acceptable adhesion to rubber as a result of such previous treatment, can be made to develop excellent adhesion consistently in an economical fashion by re-treating the textile with an adhesive "solutioning" re-treating bath made by adding a slurry of blocked isocyanate or isocyanate dimer to the conventional RFL solution.

DETAILS OF THE INVENTION

The adhesive re-treating composition employed in the invention accordingly contains water, dispersed blocked isocyanate or isocyanate dimer, dispersed rubber, fusible, partially reacted resorcinol-formaldehyde resin, and formaldehyde. The solids content of the aqueous re-treating adhesive as applied to previously treated textile is in many cases 3.5 to 16 percent, preferably 8 to 12 percent, based on the weight of the entire aqueous composition. The isocyanate material (blocked isocyanate or isocyanate dimer) is frequently present in the retreatment adhesive in amounts of from 0.2 to 3.0 percent, preferably 0.5 to 2.6 percent, based on the weight of the entire aqueous adhesive re-treatment composition as applied to the textile. On the same basis, the rubber content of the re-treatment adhesive is frequently from 2 to 15.1 percent, preferably 2.2 to 12 percent, and the amount of resorcinol-formaldehyde resin is usually 0.3 to 2.62 percent, preferably 0.6 to 1.71 percent. The amount of formaldehyde (or equivalent formaldehyde-yielding substance such as paraformaldehyde) employed is in many cases from 0.25 to 1.39 percent, preferably 0.3 to 0.91 percent, based on the weight of the entire aqueous re-treating composition as applied to the textile. The amounts of the ingredients expressed as percentages based on the weight of the solids content of the re-treatment adhesive in typical practice of the invention are as follows: isocyanate material, 1.49 to 30.35 percent, preferably 6.98 to 13.04 percent; rubber, 58.87 to 81.78 percent, preferably 71.4 to 76.85 percent; resorcinol-formaldehyde resin, 8.96 to 13.11 percent, preferably 11.44 to 12.38 percent; and formaldehyde, 2.27 to 3.4 percent, preferably 2.96 to 3.18 percent.

The solutioning bath used for conventional pretreatment is similarly constituted, except that it does not contain the isocyanate material and is usually applied at higher solids content.

The rayon or nylon textile material employed in the invention may be in any suitable desired form, such as yarns, cords or fabrics. The conventional primary adhesive and the re-treatment adhesive may be applied to the textile in any suitable desired manner; in the tire manufacture this is most commonly done by passing the textile, in the form of cord fabric, continuously through a bath containing the adhesive. This dipping operation is known as "solutioning." After emerging from the solutioning bath, the textile is dried, conveniently by heating at an elevated temperature, in accordance with conventional practice, for example in a circulating air oven, usually at a temperature of at least 250°F and sometimes considerably higher, e.g., 440°F. Rayon is frequently conventionally dried at 275° to 350°F, nylon at 335° to 425°F. Nylon is also conventionally hot stretched while heating, ordinarilly at quite elevated temperatures, e.g., 420° – 440°F. The heating is usually completed in 2 to 4 minutes, frequently in 2.3 to 2.7 minutes. It will be understood that the textile is dried after the re-treatment as well as after primary treatment. The pick-up of dry adhesive solids as a result of conventional primary treatment is frequently from 4 to 7 percent based on the dry weight of the textile before treatment, but is usually only from 0.25 to 2 percent in the re-treatment. Following re-treatment and drying, the textile is laminated to the vulcanizable rubber stock which it is desired to reinforce, for example by calendering the rubber stock onto the treated textile, and thereafter the resulting laminate is subjected to conventional vulcanizing conditions at elevated temperature to vulcanize the rubber stock. A strong adhesive bond is thus developed between the re-treated textile and the rubber. It is believed that the blocked isocyanate or isocyanate dimer may function in the adhesion system by reacting with the hydroxy groups in the rayon and the hydroxy groups in the resorcinol-formaldehyde resin to form dicarbamates. In the case of nylon, it is believed that there may be formed a urea type linkage with the amide nitrogen and terminal amine groups of the nylon. If effect, there is developed a strong chemical bond between the textile and the RFL resin.

The invention is not limited to tire cord use, but may be applied as well to rayon or nylon textile to be used as reinforcement in other laminated or composite articles, such as rubber hose, belts, rubber coated fabric and the like.

If desired, the described isocyanate-containing adhesive composition may be used as a primary treatment rather than as a re-treatment. It is an important advantage of the aspect of the invention that, since the adhesive of the invention has relatively low solids content, the susceptibility to what is known as "window-paning," which is actually the formation of a film of solid adhesive material between the cords, is decreased. Also, stiffness of the cord is decreased. When used as a primary treatment, the adhesive of the invention usually gives a pick-up of from 1.25 to 3.5 percent. The relatively high concentration of solids in the dip in conventional practices results in a higher pick-up of adhesive solids on the textile. The higher amount of adhesive solids results, in conventional practice, in a susceptibility to window-paning. This is undesirable because excessive window-paning tends to reduce mechanical adhesion by preventing the rubber from completely penetrating between the cords. The high concentration of adhesive solids in conventional practice also produced greater stiffness of the cord. Decreased stiffness of the cord is an important objective because, as a general rule, tire cord stiffness has a direct relationship to cord fatigue. Fabric curling and handling problems are also reduced when cord stiffness is reduced.

To prepare the adhesive re-treating composition of the invention the blocked isocyanate or isocyanate dimer is provided in finely divided form, suitably as a slurry in water, which may conveniently be made by ball milling the solid blocked isocyanate or isocyanate dimer with water in the presence of a small amount of a dispersing agent. Usually this slurry as prepared contains from 75 to 80 percent of water, from 18 to 24 percent of blocked isocyanate or isocyanate dimer, and from 1 to 2 percent of dispersing agent. The blocked isocyanate and isocyanate dimer are relatively inert, being stable in the presence of water at room temperature. However, when heated to elevated temperatures, these compounds dissociate, yielding free isocyanate compounds capable of undergoing all the reactions characteristics of isocyanate compounds. Thus, under the influence of the elevated temperatures to which the re-treated solutioned fabric is exposed in drying and to which the rubber-fabric laminate is subjected during vulcanization, free isocyanate is liberated to develop the adhesive chemical bond previously described.

The blocked isocyanates and isocyanate dimers are of course known materials, and require no detailed description here. A detailed disclosure of blocked isocyanates useful in the present invention will be found in Thompson, U. S. Pat. No. 2,994,671, particularly column 3, line 5 to column 4, line 51. Blocked isocyanates, and isocyanate dimers, are also disclosed in Krysiak U.S. Pat. No. 3,234,067, column 9, lines 39–66. Similarly, Shoaf, U.S. Pat. No. 3,307,966 describes the blocked isocyanates and isocyanate dimers, particularly at column 11, lines 21–64. Kigane et al., U.S. Pat. No. 3,325,333 discloses a number of phenolic blocking groups, particularly at column 2, lines 20–22. Many of the useful blocked isocyanates are represented by the formula $Ar(NHCOX)_n$ and many of the useful isocyanate dimers are represented by the formula $[Ar(NCO)_n]_2$ wherein Ar may be any organic residue containing at least one aromatic nucleus as described in the foregoing references, X is a blocking group as described in the references, particularly a radical selected from the group consisting of aryloxy, arylthio, iminoxy and lactam-N-yl, and n is a whole number of at least 2. An example of a suitable blocked isocyanate is "Hylene" MP, which is phenol blocked methylenebis (4-phenylisocyanate). This material has a molecular weight of 439. Another example is the biscaprolactam adduct of toluene-2,4-diisocyanate sold as "Hylene" T. An example of an isocyanate dimer is the dimer of methylenebis (4-phenylisocyanate); another example is the dimer of toluene diisocyanate, "Desmodure" TT.

To provide the aqueous adhesive re-treating composition of the invention, the described slurry of isocyanate material (blocked isocyanate or isocyanate dimer) is added to the RFL (resorcinol-formaldehyde-latex) solution, which may be formulated in accordance with conventional practice. The rubber latex in the RFL may be natural rubber (Hevea) latex, or a latex of conjugated diolefin polymer synthetic rubber, or mixtures thereof, or an aqueous dispersion of reclaim from such rubbers, or mixtures of any such latices and reclaim dispersions. Such conjugated diolefin polymer synthetic rubbers are polymers of butadienes-1,3, e.g., butadiene-1,3, isoprene, 2,3-dimethyl-butadiene-1,3 and polymers of mixtures thereof and copolymers of mixtures of one or more such butadienes-1,3, with one or more other polymerizable compounds which are capable of forming rubbery copolymers with butadienes-1,3, for example up to 60 percent by weight of such mixtures of one or more monoethylenic compounds which contain

group where at least one of the disconnected valences is attached to an electronegative group, that is, a group which substantially increased the electrical dissymmetry or polar character of the molecule. Examples of the compounds which contain a

group and are copolymerizable with butadienes-1,3 are aryl olefins, such as styrene, vinyl toluence, alpha-methylstyrene, chlorostyrene, dichlorostyrene, vinyl naphthalene; the alpha-methylene carboxylic acids and their esters, nitriles and amides, such as acrylic acid, methyl acylate, methyl methacrylate, acrylonitrile, methacrylonitrile, methacrylamide; vinylpyridines such as 2-vinylpyridine, 2-methyl-5-vinylpyridine; methyl vinyl ketone. Examples of such conjugated diolefin polymer synthetic rubbers are polybutadiene (whether high cis-content or low cis-content; whether solution-prepared or emulsion-prepared), polyisoprene (whether natural or synthetic), butadiene-styrene copolymers (SBR; solution-prepared or emulsion-prepared), butadiene-acrylonitrile copolymers, butadiene-vinyl-pyridine copolymers, and butadiene-styrene-vinylpyridine copolymers.

The resorcinol-formaldehyde resin employed in the RFL solution may be described as a fusible, partially reacted resorcinol-formaldehyde resin, such as a condensate of resorcinol and formaldehyde in the ratio of one mole of resorcinol to about 0.5 to 0.8 mole of formaldehyde. The formaldehyde or formaldehyde-yielding agent (e.g., paraformaldehyde or hexamethylenetetramine), under the influence of the elevated temperatures involved in the adhesive process, cures the fusible resin to an infusible state.

It is an advantage of the invention that a single type of re-treating solution can be used for both rayon and nylon. This is an economical (low solids) dip made by adding the isocyanate slurry to the kind of solution normally used with nylon. It is not necessary to provide a different re-treating solution for rayon.

The solid rubber stock used in the present invention for making the rubber and fabric laminates for use in tire manufacture and for other purposes may be any sulfur-vulcanizable natural (Hevea) rubber of conjugated diolefin polymer synthetic rubber or mixtures of any of them including their reclaims, as described above in connection with the rubber of the latex in the RFL solution. The solid rubber stock will of course contain conventional compounding and vulcanizing ingredients such as carbon black, rubber processing or softening oils which may be added as such or may be present from oil-extended rubbers, antioxidants, sulfur, zinc oxide and accelerators, as in conventional practice. The stock may include conventional adhesion-promoting chemicals, such as for example those disclosed in Belgian Pat. No. 683,718, July 6, 1966, U. S. Rubber Co.

A procedure for testing the adhesive bond between the rubber and the textile involves preparing an adhesion pad by applying a calendered layer of vulcanizable rubber stock approximately 0.015 inch thick to each side of the treated cords in parallel arrangement, 24 ends to the inch. Aluminum strips are inserted between the rubber and the fabric at one end of the test pad to permit later separation of the ends for gripping by the jaws of a tear testing machine. The test pad is placed in a mold and heated to vulcanize the rubber stock. The test pad is removed from the mold and cut into strips 1 inch × 3 inch, with the cords running length-wise. The aluminum strips are removed from the end of the pad. The separated ends are gripped in the jaws of a tear testing machine (an Instron tested) and the force in pounds required to separate the test strip at a jaw separation rate of 5 inch per minute is measured. The separated surface is then examined to see how much of the cord has become visible due to stripping of the rubber from the cord. This is recorded according to the following scale:

| Rating | Kind of Failure | Appearance |
|---|---|---|
| 5 | 100% rubber failure | No cord visible |
| 4 | 75% rubber failure | 25% cord visible |
| 3 | 50% rubber failure | 50% cord visible |
| 2 | 25% rubber failure | 75% cord visible |
| 1 | No rubber failure | 100% cord visible |

Thus, the highest value (5) on the scale indicates that the adhesive bond is so strong that the failure occurs in the rubber stock; the lowest value (1) on the scale indicates the weakest bond, failure occuring at the interface of the rubber stock and the cord rather than in the rubber stock itself.

The following examples, in which all quantities are expressed by weight unless otherwise indicated, will serve to illustrate the practice of the invention in more detail.

EXAMPLE 1

This example illustrates the form of the invention in which a blocked isocyanate adhesive re-treating composition of the invention is employed to re-treat rayon tire cord textile which has previously been treated with conventional RFL adhesive solution but has nevertheless failed to develop satisfactory adhesion.

A solutioning bath of the kind conventionally used on rayon cords is prepared, containing 80 parts solids of a copolymer of 75 parts of butadiene and 25 parts of styrene, 20 parts solids of a latex of a terpolymer of 70 parts of butadiene and 15 parts of vinyl pyridine and 15 parts of styrene, 8 parts of a commercial partially reacted resorcinol-formaldehyde resin (ratio of 1 mole of resorcinol to about 0.7 of formaldehyde) having a ball and ring softening point of about 110°C., 0.5 part of ammonia and 2 parts of formaldehyde. This composition is designated solution (A), 24 percent solids.

The rayon tire cord employed in this example is American Viscose rayon (FMC), 1650 denier, 3 ply. The grey rayon cord is dipped into the described pretreating solution (A), and dried in a circulating air oven at 350°F. for 3 minutes. The amount of dry adhesive solids deposited on the cord in 5.0 percent by weight (increase in weight of the dried cord based on the dry weight of the original untreated cord).

A solid rubber carcass stock is prepared by milling 70 parts of oil-extended SBR (52.5 parts of polymer [containing e.g., 23 percent of styrene] and 17.5 parts of oil [e.g., naphthenic type petroleum hydrocarbon extender oil]), 50 parts of natural rubber and 50 parts of carbon black, after which the following ingredients are mixed into the batch in conventional manner: 1.5 parts of stearic acid, 25 parts of reclaimed rubber, 10 parts of zinc oxide, 1 part of acetone-di-phenylamine antioxidant (BLE), 5 parts of pine tar softener, 1 part of benzothiazyl disulfide accelerator (MBTS), 0.1 part of diphenyl guanidine accelerator (DPG), and 3.2 parts of sulfur.

An adhesion test pad of the kind described above is prepared by applying a calendered layer of the vulcanizable rubber stock to each side of a sample of the adhesive-treated rayon cord fabric. The resulting laminate is vulcanized in a mold for 8 minutes at 330°F. For some reason that is not entirely understood, this conventionally treated rayon behaves in a sub-standard manner, that is, it fails to develop satisfactory adhesion, and gives an adhesive bond strength of only 25 pounds (all adhesion values herein are measured at 250°F). The appearance rating is also unsatisfactory, being a mere 1.5.

A slurry is prepared by ball milling for 24 hours 100 parts of phenol-blocked methylenebis (4-phenylisocyanate) (Thompson, U.S. Pat. No. 2,994,671, Example 1), 6.8 parts of sodium dioctyl sulfosuccinate (dispersing agent), and 335 parts of water. This slurry contains 23.7% by weight of blocked isocyanate, and is designated slurry (B).

An RFL solutioning bath of the kind conventionally used with nylon is provided, containing 100 parts solids of a latex of a copolymer of 70 parts of butadiene, 15 parts of vinylpyridine and 15 parts of styrene, 15 parts of a commercial partially reacted fusible resorcinol-formaldehyde resin (ratio of 1 mole to about 0.7 mole of formaldehyde) having a ball and ring softening point of about 110°C., 0.9 part of ammonia and 4.25 parts of formaldehyde. This RFL solution, which is designated solution (C), has a total solids content of 21.0 percent.

Another sample of the rayon tire cord, previously pre-treated as described, is now re-treated with an adhesive re-treating composition of the invention made by mixing 75 parts of the blocked isocyanate slurry (B) with 275 parts of the conventional nylon solutioning composition (C) along with 325 parts of water, to provide a treating solution having a total solids content of 11.6 percent. The concentration of blocked isocyanate in this final treating solution is 2.52 percent, based on the entire weight of the solution. Based on the entire weight of the solution, the concentrations of the other ingredients are: 7.47 percent rubber solids; 1.19 percent resorcinol-formaldehyde resin; and 0.31 percent formaldehyde. The additional pick-up as a result of the re-treatment is 1.5 percent. The re-treated rayon cord is dried at 335°F. for 3 minutes, laminated to the previously described rubber stock, and vulcanized as previously described. The adhesive bond strength resulting from this re-treatment is surprisingly improved to a value of 37 pounds; the appearance rating rises to a satisfactory level of 4.8. On the other hand, if, instead of re-treating the conventionally solutioned rayon with a re-treating composition of the invention containing blocked isocyanate, there is employed instead in the re-treating the conventional rayon adhesive of the same composition as used in the pre-treatment (containing no blocked isocyanates) such re-treatment does not improve the adhesion appreciably, but gives an unsatisfactory adhesion value of a mere 28 pounds, appearance rating merely 2.5.

It will thus be seen that the re-treating procedure of the invention uniquely "up-grades" the treated rayon with respect to adhesive qualities, converting what was a low-grade treated material into a high-grade re-treated product.

Tests performed on the cord with and without the adhesive re-treatment of the invention reveal that the cord maintains its original breaking strength, and does not suffer any undesirable change in elongating properties, as a result of the treatment of the invention.

EXAMPLE 2

Example 1 may be repeated, substituting the nylon-type solutioning bath (C) for the rayon-type solutionary bath (A) in the pre-treatment step, with similar results.

EXAMPLE 3

Example 1 or 2 may be repeated, substituting, in the re-treatment solutionary step, a re-treatment bath made by mixing the blocked isocyanate slurry (B) with the rayon-type solutioning bath (A), with similar results.

EXAMPLE 4

This example illustrates the re-treatment of nylon tire cord which fails to develop satisfactory adhesion after a primary treatment with conventional nylon adhesive solution.

To carry out the pretreatment, grey nylon tire cord (e.g., type A06) is solutioned with conventional nylon solutioning bath (C), as described in Example 1. The cord is dried at 350°F for about 2½ minutes. The pick-up is 5 percent. Lamination to the rubber stock described in Example 1 and vulcanization as previously described produces, for some reason that is not entirely understood, and an unsatisfactory appearance rating of 3.5.

A sample of the pre-treated cord is re-treated, using an adhesive composition of the invention made by mixing the blocked isocyanate slurry (B) with conventional nylon treating solution (C). The total solids of the aqueous re-treating solution is 11.25 percent; the blocked isocyanate content is 0.5 percent, based on the entire weight of the solution; the blocked isocyanate content is 4.4 percent, based on the total solids content of the solution. The re-treated nylon cord is dried at 400°F for about 2½ minutes. The pick-up of additional dry adhesive solids is 2.0 percent. Adhesion test pads prepared as described previously now show the adhesion level to be 28 pounds; the appearance rating is now 4.0.

In contrast, if the pre-treated nylon cord is merely re-treated with the conventional nylon adhesive solution (C), containing no blocked isocyanate, the adhesion value is not appreciably improved, being only 25 pounds, with an unsatisfactory appearance rating of 3.8.

It will thus be apparent that the re-treatment upgraded the originally substandard treated nylon tire cord, converting a material of relatively little value into a highly valuable material.

EXAMPLE 5

This example illustrates the use of retreating composition of the invention as a primary treatment of nylon cord.

Greige nylon tire cord is treated with a mixture of blocked isocyanate slurry (B) described in Example 1 and conventional nylon solution (C) described in Example 1, the total solids content of the mixture being 10.66 percent, and the amount of blocked isocyanate being 1.08 percent by weight, based on the total weight of the mixture. The treated cord is dried at 350°F for about 3 minutes. The pick-up of dry adhesive solids is 2.5 percent. Test pads are made by calendering the vulcanizable rubber stock described in Example 1 to the treated nylon tire cord, and vulcanizing at 330°F for about 8 minutes. The adhesive bond strength is 35 pounds; the appearance rating is 5.0. In contrast to these remarkably improved results, a similar laminate of nylon cord to the same rubber stock, wherein the cord is treated with a similar solution from which the blocked isocyanate slurry has been omitted, produces an adhesion of a mere 25 pounds, and an appearance rating of only 3.5.

EXAMPLE 6

Example 5 may be repeated with rayon cord.

Having thus described our invention, what we claim and desire to protect by Letters Patent is:

1. A method of up-grading otherwise wasted substandard rayon textile material to which has been applied a primary adhesive composition comprising an isocyanate-free aqueous dispersion of rubber latex, partially reacted resorcinol-formaldehyde resin and formaldehyde, said primary adhesive composition having been applied to the textile in a grey state followed by drying of the thus treated textile, the thus primary treated and dried textile being characterized by the fact that, if a sample of the fabric were laminated to a vulcanizable rubber stock and the rubber vulcanized, poor adhesion of the sample to the rubber would be obtained, the said up-grading being accomplished by re-treating the textile material after said treatment with said primary adhesive composition and drying and before lamination to vulcanizable rubber stock, with a retreating adhesive composition consisting essentially of an aqueous dispersion of non-methylolated phenol-blocked methylenebis (4-phenyl-isocyanate), rubber latex, partially reacted resorcinol-formaldehyde resin, and formaldehyde, and thereafter dry-ing the thus re-treated material, whereby upon laminating to vulcanizable rubber stock and vulcanizing the rubber, the textile develops good adhesion to the rubber.

2. A method as in claim 1 in which the rubber of said rubber latex is styrene-butadiene copolymer.

3. A method as in claim 1 in which the rubber in said rubber latex is styrene-butadiene-vinyl pyridine terpolymer.

4. A method as in claim 1 in which the rubber of said rubber latex is a mixture of styrene-butadiene copolymer and styrene-butadiene-vinyl pyridine terpolymer.

5. A method as in claim 1 in which the amount of said isocyanate material in the re-treating composition is from 0.2 to 3.0 percent, based on the total weight of the composition.

6. A method as in claim 1, in which the total solids content of the re-treating composition is from 3.5 to 16 percent by weight.

7. A method as in claim 1 in which, in the re-treating composition, the amount of said isocyanate material is from 0.5 to 2.6 percent, the amount of rubber is from 2.2 to 12 percent, the amount of partially reacted resorcinol-formaldehyde resin is from 0.6 to 1.71 percent, and the amount of formaldehyde is from 0.3 to 0.91 percent, based on the entire weight of the aqueous dispersion.

8. Rayon textile material treated as in claim 1.

9. Rayon textile material re-treated according to the method of claim 3.

10. A method of adhering rayon textile material to rubber comprising carrying out, in succession, first the primary adhesive treatment of the grey textile as recited in claim 1, followed by re-treatment of the textile material as in claim 1, laminating the dried re-treated textile material to rubber, and vulcanizing the rubber to bond the textile to the rubber.

11. A method as in claim 10, in which the amount of said isocyanate material in the re-treating composition is from 0.2 to 3.0 percent, based on the total weight of the composition.

12. A method as in claim 10, in which, in the re-treating composition, the amount of said isocyanate material if from 0.5 to 2.6 percent, the amount of rubber is from 2.2 to 12 percent, the amount of partially reacted resorcinol-formaldehyde resin is from 0.6 to 1.71 percent, and the amount of formaldehyde is from 0.3 to 0.91 percent, based on the entire weight of the aqueous dispersion.

13. A method as in claim 10, in which the said rubber of the rubber latex is styrene-butadiene-vinyl pyridine terpolymer.

14. A laminate of vulcanized rubber stock to rayon textile material produced by the method of claim 10.

15. A laminate of rayon textile material to vulcanizable rubber stock produced by the method of claim 13.

16. A laminate as in claim 14, which is a pneumatic tire.

* * * * *